United States Patent
Kuo et al.

(10) Patent No.: US 12,367,381 B2
(45) Date of Patent: Jul. 22, 2025

(54) CHAINED NEURAL ENGINE WRITE-BACK ARCHITECTURE

(71) Applicant: Apple Inc., Cupertino, CA (US)

(72) Inventors: Ponan Kuo, Sunnyvale, CA (US); Hsiao-Chen Chang, Los Altos, CA (US); Ji Liang Song, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 690 days.

(21) Appl. No.: 16/942,263

(22) Filed: Jul. 29, 2020

(65) Prior Publication Data

US 2022/0036163 A1    Feb. 3, 2022

(51) Int. Cl.
*G06N 3/063* (2023.01)
*G06N 3/045* (2023.01)

(52) U.S. Cl.
CPC ............ *G06N 3/063* (2013.01); *G06N 3/045* (2023.01)

(58) Field of Classification Search
CPC .................. G06N 3/063; G06N 3/045
See application file for complete search history.

(56) References Cited

U.S. PATENT DOCUMENTS

| | | | |
|---|---|---|---|
| 5,285,524 A | 2/1994 | Cok | |
| 9,489,622 B2 | 11/2016 | Modha | |
| 10,417,553 B2 | 9/2019 | Adachi et al. | |
| 11,704,535 B1 * | 7/2023 | Vemuri | G06N 3/0464 706/31 |
| 2016/0342890 A1 * | 11/2016 | Young | G06N 3/08 |
| 2018/0285719 A1 * | 10/2018 | Baum | G06F 7/501 |
| 2018/0307438 A1 * | 10/2018 | Huang | G06F 7/523 |
| 2019/0018815 A1 * | 1/2019 | Fleming | G06F 9/5027 |
| 2021/0012186 A1 * | 1/2021 | Venkatesh | G06N 3/04 |
| 2021/0312325 A1 * | 10/2021 | Abdelaziz | H04L 67/1001 |

\* cited by examiner

*Primary Examiner* — Michelle T Bechtold
*Assistant Examiner* — Moriam Mosunmola Godo
(74) *Attorney, Agent, or Firm* — Sterne, Kessler, Goldstein & Fox P.L.L.C.

(57) ABSTRACT

Embodiments relate to a neural processor circuit that includes a first number of neural engine circuits, a second number of channels and a data processor circuit. The first number of neural engine circuits are pipelined into the second number of chains smaller than the first number. Each of the chains is configured to generate output data of a first size. Each of the channels is coupled to each of the chains and configured to transmit the output data from each of the neural engine circuits in the chains sequentially. The data processor circuit is coupled to the channels to receive the output data. The data processor circuit aggregates the output data of each of the chains into aggregated data of a second size larger than the first size and writes the aggregated data of the second size into a buffer memory of the data processor circuit.

20 Claims, 10 Drawing Sheets

CHAINED NEURAL ENGINE WRITE-BACK ARCHITECTURE

BACKGROUND

1. Field of the Disclosure

The present disclosure relates to a chained neural engine circuit architecture for memory write-back of output data.

2. Description of the Related Art

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of the CPU as well as increase the overall power consumption.

SUMMARY

Embodiments relate to a neural processor circuit with a chained neural engine circuit write-back architecture. The neural processor circuit includes a first number of neural engine circuits, a second number of channels and a data processor circuit. The first number of neural engine circuits are pipelined into the second number of chains smaller than the first number. Each of the chains is configured to generate output data of a first size. Each of the channels is coupled to each of the chains and configured to transmit the output data from each of the neural engine circuits in the chains sequentially. The data processor circuit is coupled to the channels to receive the output data from each of the chains. The data processor circuit aggregates the output data of each of the chains into aggregated data of a second size larger than the first size. The data processor circuit writes the aggregated data of the second size into a buffer memory of the data processor circuit.

Figure 1:
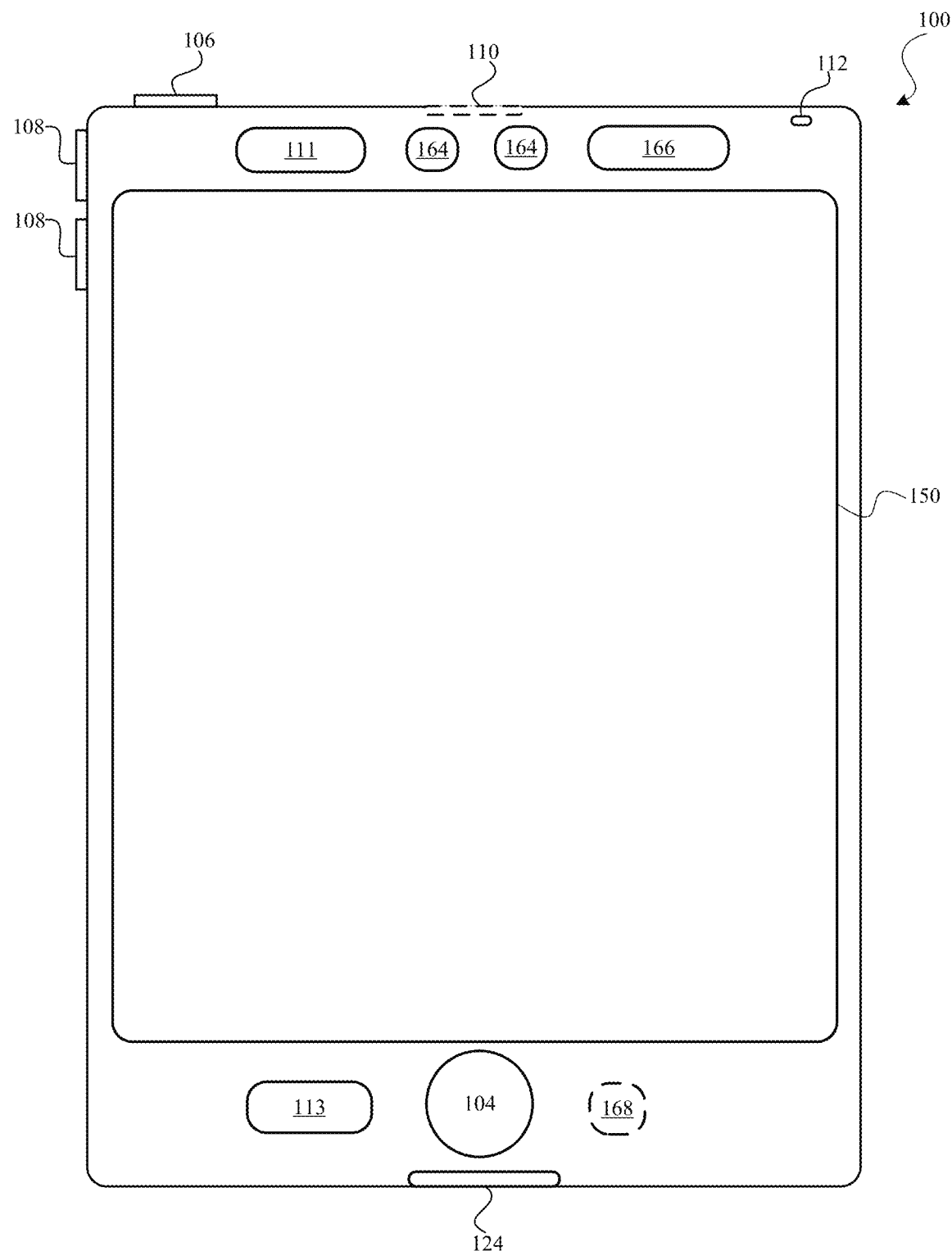
FIG. 1 is a high-level diagram of an electronic device, according to one embodiment.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to a chained write-back architecture of a neural processor circuit. The neural processor circuit with the chained write-back architecture includes neural engines, channels fewer than a number of neural engines, and a data processor circuit. The neural engines are pipelined into chains, and a number of chains corresponds to a number of channels. Each of the chains generates output data of a first size (e.g., 64 Bytes). Each of the channels is coupled to each of the chains. Each of the channels transmit output data from each of the neural engines in the chains sequentially to the data processor circuit. The data processor circuit aggregates the output data of each of the chains into aggregated data of a second size (e.g., 256 Bytes) larger than the first size. The data processor circuit writes the aggregated data of the second size back into the buffer memory of the data processor circuit. The chained write-back architecture advantageously reduces or eliminates data congestion when output data from the neural engines are written back into the buffer memory. Another advantage of the chained write-back architecture is that heat can be evenly distributed across neural engines of the neural processor circuit.

Example Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions.

Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, image sensors 164 may be associated with different lens configuration. For example, device 100 may include rear image sensors, one with a wide-angle lens and another with as a telephoto lens. Device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as touch screen 150, one or more components may also be located on an opposite side of device 100. For example, front side of device 100 may include an infrared image sensor 164 for face recognition and another image sensor 164 as the front camera of device 100. The back side of device 100 may also include additional image sensors 164 as the rear cameras of device 100.

Figure 2:
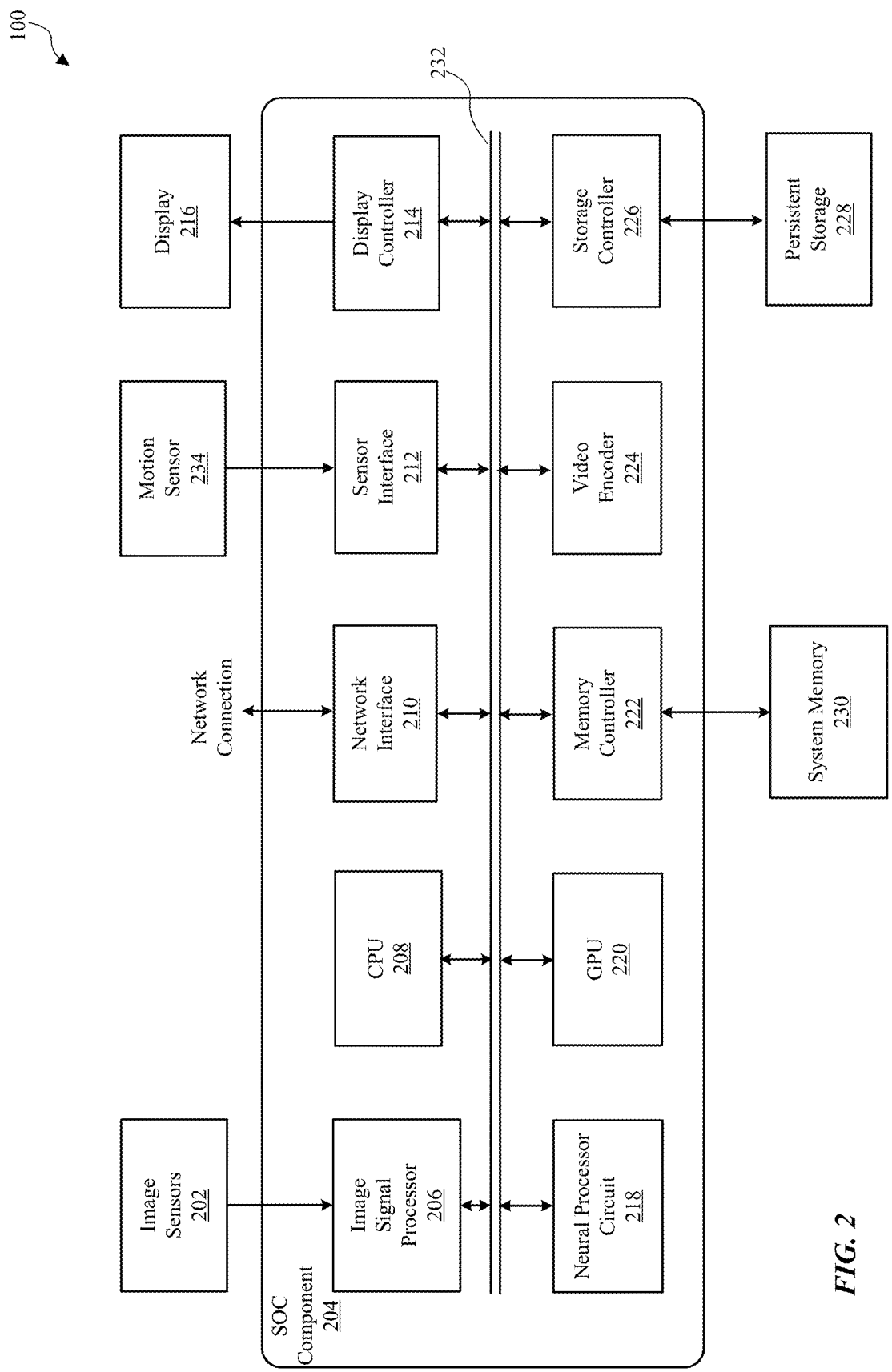
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensors 202 are components for capturing image data and may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 216 may display various images, such as menus, selected operating parameters, images captured by image sensors 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensors 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphics operations. For example, GPU 220 may render objects to be displayed into a frame buffer (e.g., one that includes pixel data for an entire frame). GPU 220 may include one or more graphics processors that may execute graphics software to perform a part or all of the graphics operations, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from image sensors 202 and processed by ISP 206, and then sent to system memory 230 via bus 232 and memory controller 222. After the image data is stored in system memory 230, it may be accessed by video encoder 224 for encoding or by display 216 for displaying via bus 232.

In another example, image data is received from sources other than image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages. The image data may then be returned to system memory 230 or be sent to video encoder 224, display controller 214 (for display on display 216), or storage controller 226 for storage at persistent storage 228.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
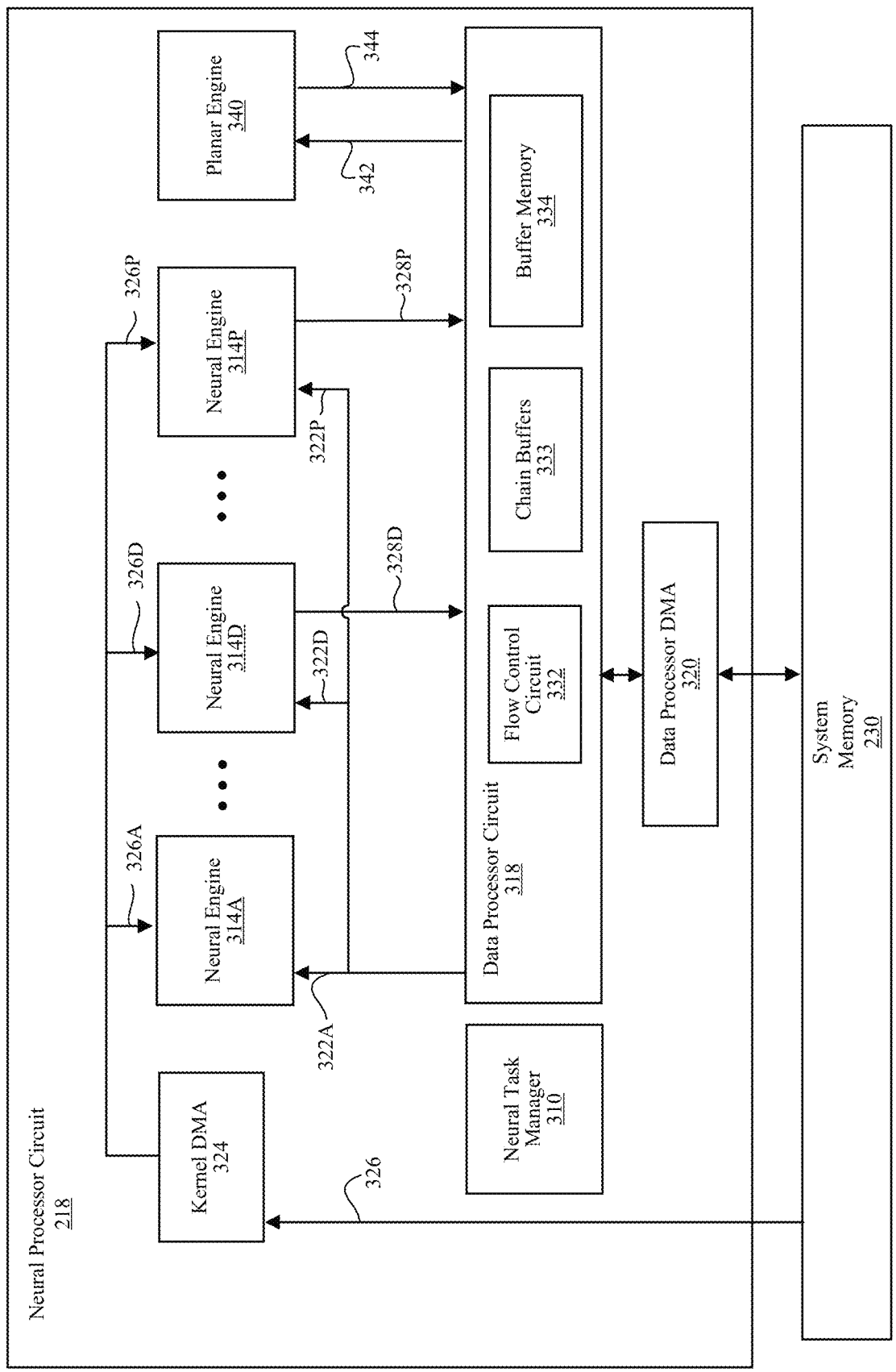
FIG. 3 is a block diagram illustrating a neural processor circuit, according to one embodiment.

Referring to FIG. 3, an example neural processor circuit 218 may include, among other components, neural task manager 310, multiple neural engines 314A through 314P (hereinafter collectively referred as "neural engines 314" and individually also referred to as "neural engine 314"), kernel direct memory access (DMA) 324, data processor circuit 318, data processor DMA 320, and planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Different subsets of neural engines 314 are pipelined into chains. In this way, congestion of output data 328 within neural processor circuit 218 when output data 328 generated from neural engines 314 are written back into a buffer memory 334 of data processor circuit 318 may be reduced or eliminated. Each chain includes a different subset of neural engines 314 and is interfaced with data processor circuit 318 for writing back output data 328. Output data 328 is written into data processor circuit 318 after propagating through each chain. Thus, only the last neural engine 314 in each chain is interfaced with data processor circuit, e.g., neural engines 314D and 314P sending output data 328D and 328P from corresponding chains into data processor circuit 318. Organization of neural engines 314 into multiple chains of neural processor circuit 218 is described below in detail with reference to FIGS. 5A-5B and FIG. 6.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar).

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside neural processor circuit 218.

Kernel DMA 324 is a read circuit that fetches kernel data from a source (e.g., system memory 230) and sends kernel data 326A through 326P to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332, chain buffers 333 and buffer memory 334. Buffer memory 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer memory 334 is embodied as a non-transitory memory that can be accessed by neural engines 314 and planar engine 340. Buffer memory 334 may store input data 322A through 322P for feeding to corresponding neural engines 314A through 314P or planar engine 340, as well as output data 328A through 328P from each of neural engines 314A through 314P or planar engine 340 for feeding back into one or more neural engines 314 or planar engine 340, or sending to a target circuit (e.g., system memory 230). Buffer memory 334 may also store input data 342 and output data 344 of planar engine 340 and allow the exchange of data between neural engine 314 and planar engine 340. For example, one or more output data 328A through 328P of neural engines 314 are used as input 342 to planar engine 340. Likewise, output 344 of planar engine 340 may be used as input data 322A through 322P of neural engines 314. The inputs of neural engines 314 or planar engine 340 may be any data stored in buffer memory 334. For example, in various operating cycles, the source datasets from which one of the engines fetches as inputs may be different. The input of an engine may be an output of the same engine in previous cycles, outputs of different engines, or any other suitable source datasets stored in buffer memory 334. Also, a dataset in buffer memory 334 may be divided and sent to different engines for different operations in the next operating cycle. Two datasets in buffer memory 334 may also be joined for the next operation.

Chain buffers 333 of data processor circuit 318 store output data 328D through 328P from each chain of neural engines 314. Each of chain buffers 333 interfaces with a corresponding chain of neural engines 314 to receive and store output data 328D through 328P. Each of chain buffers 333 may be implemented as a register (e.g., first-input first output (FIFO) register) that aggregates output data 328D through 328P from each chain of a first size (e.g., 64 Bytes) into aggregated output data of a second size larger than the first size (e.g., 256 Bytes) for each chain. The aggregated output data of the second size for each chain is stored into buffer memory 334, e.g., based on control signals from flow control circuit 332. Chain buffers 333 are described below in detail with reference to FIGS. 5A-5B.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes.

Flow control circuit 332 may also provide a signal to one or more neural engines 314 in a chain to stall output data 328 coming out from the chain when one of chain buffers 333 associated with the chain is full. Flow control circuit 332 may further control flow of the aggregated output data of the second size from chain buffers 333 into buffer memory 334 via internal channels of data processor circuit 318. Thus, flow control circuit 332 may be configured to generate a rasterization sequence used by data processor circuit 318 to understand a position (e.g., coordinate) for each unit of output data 328 of the first size output from each chain. Data flow through each chain of neural engines 314 and via the internal channels of data processor circuit 318 are described below in detail with reference to FIG. 5B, FIG. 6 and FIGS. 7A-7B.

The data of neural processor circuit 218 stored in buffer memory 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a segment of the input data from a source (e.g., system memory 230) for storing in buffer memory 334, and a write circuit that forwards data from buffer memory 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer memory 334 may be a direct memory access buffer that stores data of a machine learning model of device 100 without involvement of CPU 208.

Example Neural Engine Architecture

Figure 4:
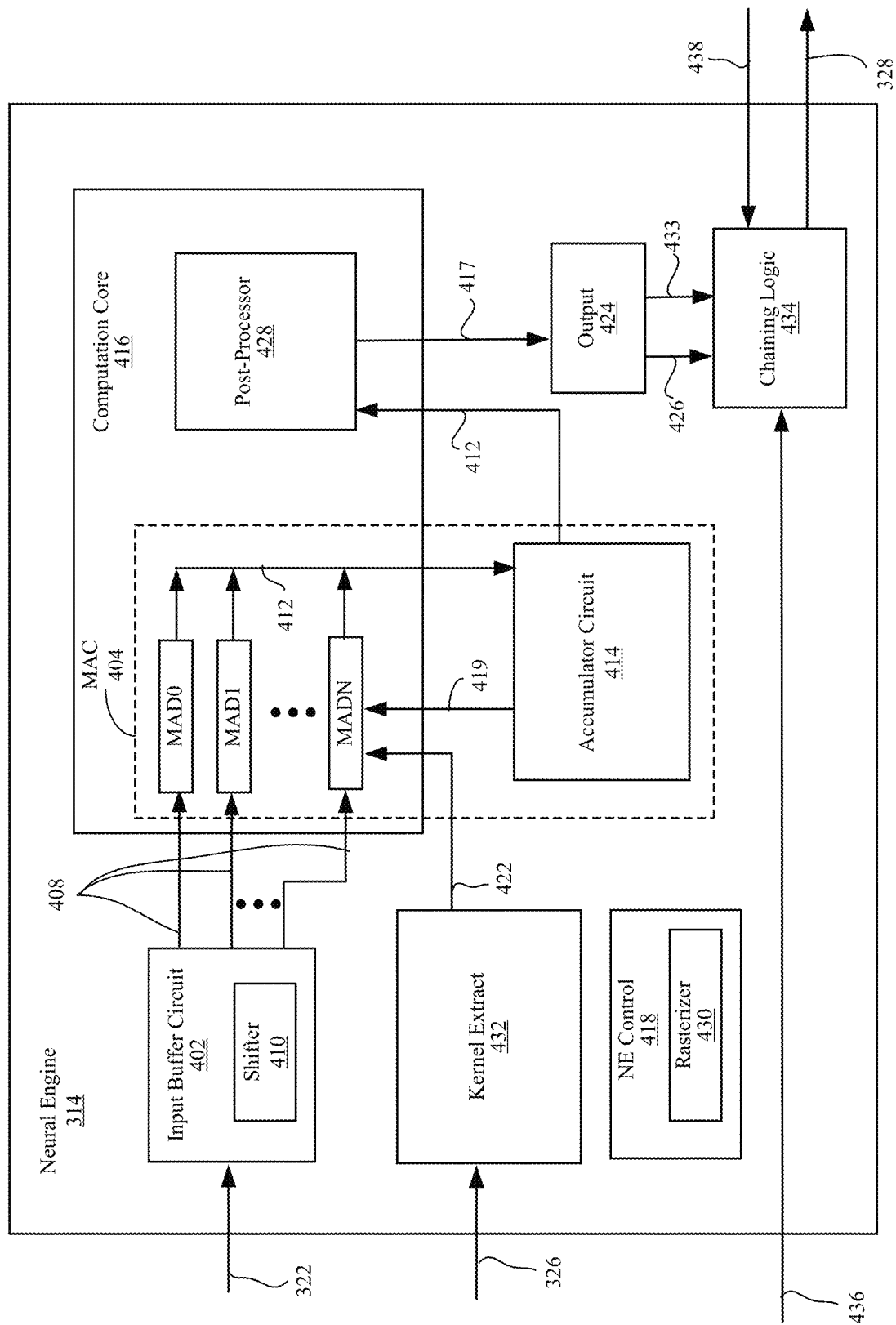
FIG. 4 is a block diagram of a neural engine in the neural processor circuit, according to one embodiment.

FIG. 4 is a block diagram of neural engine 314, according to one embodiment. Neural engine 314 performs various operations to facilitate machine learning such as convolution, tensor product, and other operations that may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator circuit 414 and output circuit 424. Neural engine 314 may further include chaining logic 434 for chaining neural engine 314 with one or more other neural engines 314 into a chain of neural engines 314. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator circuit 414 is a memory circuit that receives and stores processed values 412 from MAD circuits. The processed values stored in accumulator circuit 414 may be sent back as feedback information 419 for further multiply and add operations at MAD circuits or sent to post-processor 428 for post-processing. Accumulator circuit 414 in combination with MAD circuits form a multiply-accumulator (MAC) 404. In one or more embodiments, accumulator circuit 414 may have subunits (or batches) where each subunit sends data to different components of neural engine 314. For example, during a processing cycle, data stored in a first subunit of accumulator circuit 414 is sent to the MAC circuit while data stored in a second subunit of accumulator circuit 414 is sent to post-processor 428.

Post-processor 428 is a circuit that performs further processing of values 412 received from accumulator circuit 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator circuit 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator circuit 414 to MAD circuits, and perform different types of post-processing operations at post-processor 428. To configure components of neural engine 314 to operate in a desired manner, NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator circuit 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through MACs 404 and accumulator circuit 414. Rasterizer 430 keeps track of sizes and ranks of segments of the input/output data (e.g., groups, work units, input channels, output channels) and instructs the components of neural processor circuit 218 for proper handling of the segments of the input data. For example, rasterizer 430 operates shifters 410 in input buffer circuits 402 to forward correct segments 408 of input data to MAC 404 and send the finished output data 328 to data buffer memory 334. Other components of neural processor circuit 218 (e.g., kernel DMA 324, buffer DMA 320, buffer memory 334, planar engine 340) may also have their corresponding rasterizers to monitor the division of input data and the parallel computation of various segments of input data in different components.

Output circuit 424 receives processed values 417 from post-processor 428 and interfaces with chaining logic 434 to send processed values 417 as output data 426 into chaining logic 434. Output circuit 424 may send out output data 426 in a sequence or a format that is different from the sequence or format in which processed values 417 are processed in post-processor 428. Output circuit 424 may include a sequence generator (not shown in FIG. 4) that provides a flow control signal 433 to chaining logic 434 for controlling what output data 328 are sent out of neural engine 314.

Chaining logic 434 is a circuitry that allows neural engine 314 to be pipelined (e.g., chained) with one or more other neural engines 314 into a chain of neural engines 314. Chaining logic 434 stores output data 426 from output circuit 424. Additionally, chaining logic 434 may receive output data 436 generated by another neural engine 314 in the chain. Based on flow control signal 433, chaining logic 434 may send either output data 426 or output data 436 as output data 328 to data processor circuit 318 (e.g., if neural engine 314 of FIG. 4 is the last one in the chain) or to yet another neural engine 314 in the chain (e.g., if neural engine 314 of FIG. 4 is not the last one in the chain). Chaining logic 434 further receives control signal 438 that controls sending output data 328 out of chaining logic 434 (and out of neural engine 314). Control signal 438 (e.g., generated by flow control circuit 332) may be configured to stall output data 328 in neural engine 314 when one of chain buffers 333 associated with the chain of neural engine 314 is full (e.g., when neural engine 314 is the last neural engine in the chain). Control signal 438 may also indicate to chaining logic 434 that the corresponding one of chain buffers 333 is not full anymore and that output data 328 can be sent out of chaining logic 434 and out of neural engine 314. Alternatively, control signal 438 (e.g., generated by another neural engine 314 in the chain) may be configured to stall output data 328 in neural engine 314 when a neural engine buffer of the other neural engine 314 in the chain is full and cannot receive output data 328 from neural engine 314. Chaining logic 434 is described below in detail with reference to FIG. 6.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Chained Write-Back Architecture

Figure 5A:
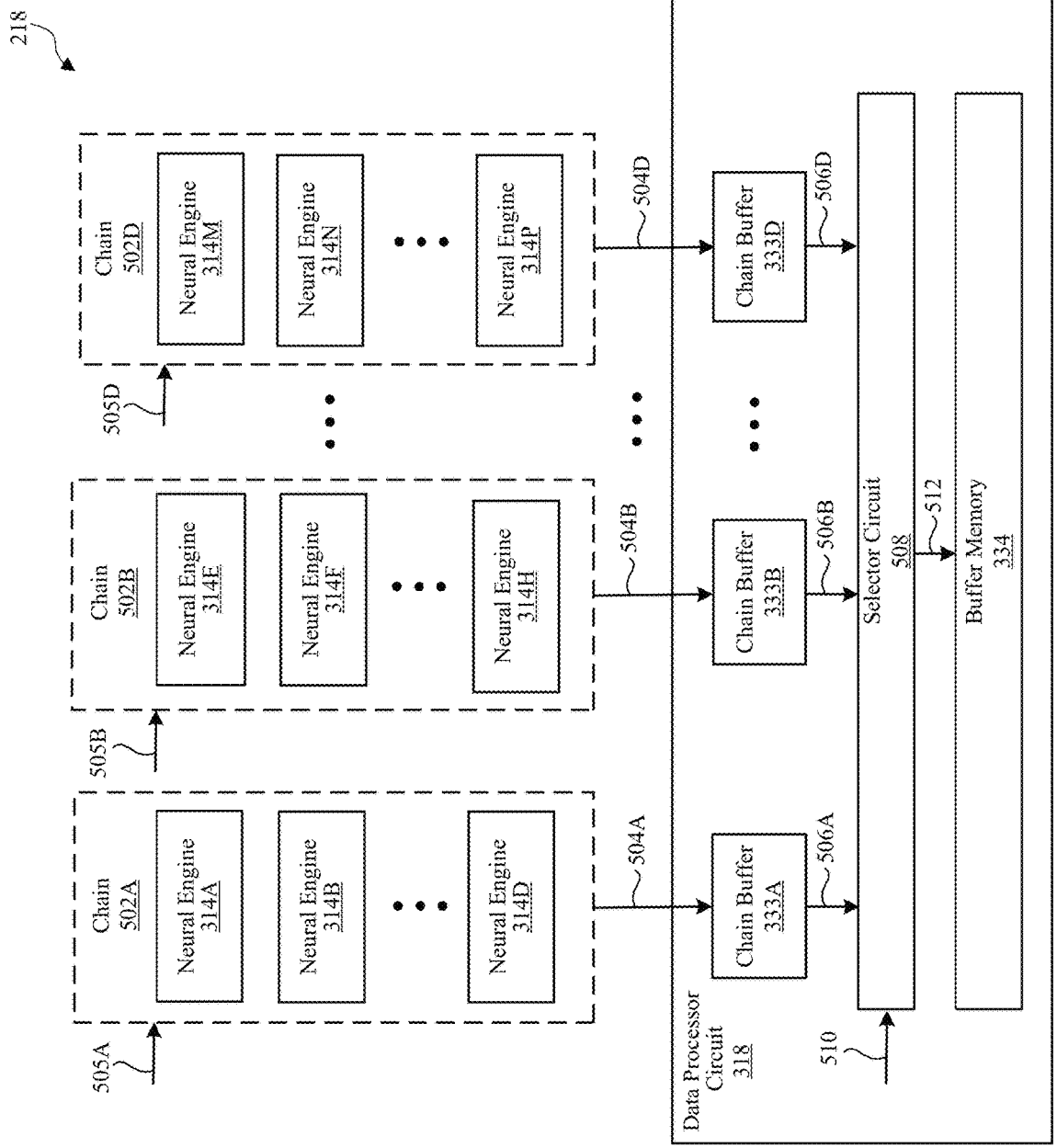
FIG. 5A is a block diagram illustrating neural engines in the neural processor circuit pipelined into chains, according to one embodiment.

FIG. 5A is a block diagram illustrating neural engines 314 pipelined into multiple chains 502A through 502D, according to one embodiment. Neural engines 314A through 314P (e.g., 16 neural engines 314) of neural processor circuit 218 are pipelined into chains 502A through 502D (e.g., four chains) fewer than the number of neural engines 314A through 314P. As illustrated in FIG. 5A, chain 502A includes neural engines 314A through 314D, chain 502B includes neural engines 314E through 314H, and chain 502D includes neural engines 314M through 314P, respectively. Hence, each chain 502A through 502D includes four different neural engines 314.

Neural engines 314A through 314D may be pipelined within chain 502A to propagate data generated by at least one of neural engines 314A through 314D. Chain 502A outputs data of a first size (e.g., 64 Bytes) generated by one of neural engines 314A through 314D onto channel 504A and chain buffer 333A of data processor circuit 318. The pipelined order of neural engines 314A through 314D in chain 502A may be configurable based on, e.g., a configuration signal 505A provided to neural engines 314A through 314D. In one or more embodiments, configuration signal 505A is generated by flow control circuit 332. Propagation of data through chain 502A for two different pipelined orders of neural engines 314A through 314D within chain 502A are described below in detail with reference to FIGS. 7A-7B.

Similarly, neural engines 314E through 314H may be pipelined within chain 502B to propagate data generated by at least one of neural engines 314E through 314H. Chain 502B outputs data of the first size generated by one of neural engines 314E through 314H onto channel 504B and chain buffer 333B of data processor circuit 318. The pipelined order of neural engines 314E through 314H in chain 502B may be configurable based on, e.g., a configuration signal 505B provided to neural engines 314E through 314H. In one or more embodiments, configuration signal 505B is generated by flow control circuit 332. Similarly, neural engines 314M through 314P may be pipelined within chain 502D to propagate data generated by at least one of neural engines 314M through 314P. Chain 502D outputs data of the first size generated by one of neural engines 314M through 314P onto channel 504D and chain buffer 333D of data processor circuit 318. The pipelined order of neural engines 314M through 314P in chain 502D may be configurable based on, e.g., a configuration signal 505D provided to neural engines 314M through 314P. In one or more embodiments, configuration signal 505D is generated by flow control circuit 332.

Chain buffer 333A aggregates data of the first size output from chain 502A into aggregated data 506A of a second size (e.g., 256 Bytes). Aggregated data 506A includes multiple units of data of the first size generated by each of neural engines 314A through 314D in chain 502A. Aggregated data 506A is passed as a unit of the second size onto a selector circuit 508. Chain buffer 333B aggregates data of the first size output from chain 502B into aggregated data 506B of the second size. Aggregated data 506B includes multiple units of data of the first size generated by each of neural engines 314E through 314H in chain 502B. Aggregated data 506B is passed as a unit of the second size onto selector circuit 508. Chain buffer 333D aggregates data of the first size output from chain 502D into aggregated data 506D of the second size. Aggregated data 506D includes multiple units of data of the first size generated by each of neural engines 314M through 314P in chain 502D. Aggregated data 506D is passed as a unit of the second size onto selector circuit 508.

Selector circuit 508 is a circuit that sends one or more of aggregated data 506A through 506D at a time via one of internal channels 512 of data processor circuit to be written into buffer memory 334. In one or more embodiments, selector circuit 508 includes one or more multiplexers for selecting one or more of aggregated data 506A through 506D for writing at a time into buffer memory 334. Selection of one or more of aggregated data 506A through 506D for writing into buffer memory 334 is based on a selection signal 510 generated by e.g., flow control circuit 332.

Figure 5B:
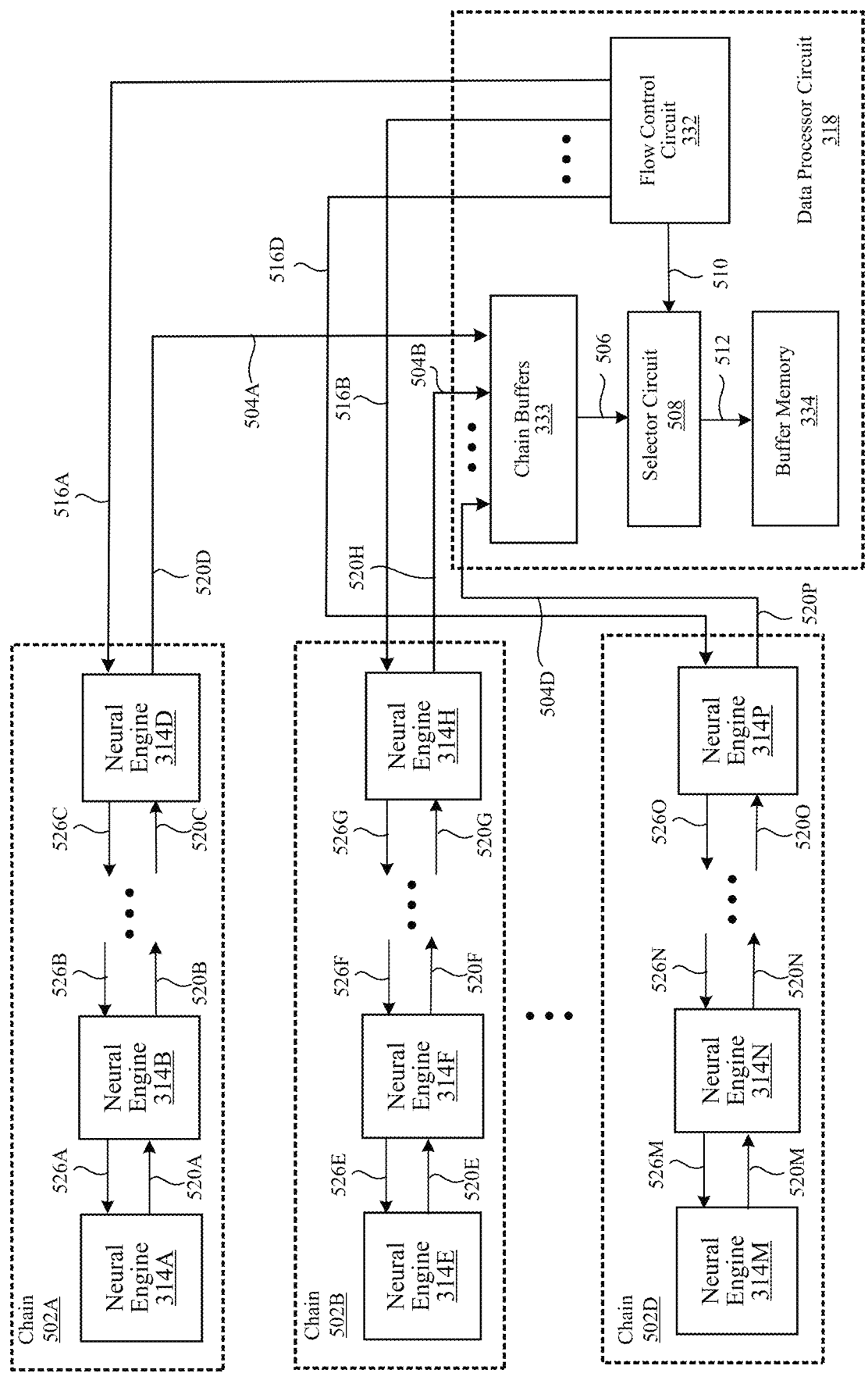
FIG. 5B is a detailed block diagram of the chains of FIG. 5A interfacing with a data processor circuit, according to one embodiment.

FIG. 5B is a detailed block diagram of chains 502A through 502D interfacing with data processor circuit 318, according to one embodiment. Neural engines 314A through 314D in chain 502A propagate data 520A through 520C of the first size and output data 520D of the first size onto one of chain buffers 333 (e.g., chain buffer 333A) via channel 504A. Flow control circuit 332 generates a control signal 516A passed onto chain 502A and at least one of neural engines 314 in chain 502A (e.g., neural engine 314D) to stall output data 520D coming out from neural engine 520D and chain 502A when one of chain buffers 333 (e.g., chain buffer 333A) is full. Control signals 526A through 526C may be generated by a corresponding neural engine 314B through 314D in chain 502A, e.g., based on control signal 516A. Control signals 526A through 526C may control sending corresponding data 520A through 520C from each neural engine 314A through 314C into a corresponding next neural engine 314B through 314D in chain 502A. Control signal 526A may be configured to stall data 520A in neural engine 314A when a neural engine buffer in neural engine 314B (e.g., neural engine buffer 606B in FIG. 6) is full and cannot store data 520A from neural engine 314A. Similarly, control signal 526B may be configured to stall data 520B in neural engine 314B when a neural engine buffer in neural engine 314C (e.g., neural engine buffer 606C in FIG. 6) is full and cannot store data 520B from neural engine 314B. Similarly, control signal 526C may be configured to stall data 520C in neural engine 314C when a neural engine buffer in neural engine 314D is full and cannot store data 520C from neural engine 314C.

Data 520A may be generated by neural engine 314A and forwarded to neural engine 314B, e.g., based on control signal 526A. Data 520B output from neural engine 314B may be either generated by neural engine 314B or may represent data 520A generated by neural engine 314A. Neural engine 314B outputs corresponding data 520B based on, e.g., a flow control signal generated within neural engine 314B. Data 520C forwarded into neural engine 314D (e.g., from neural engine 314C) may be generated by one of neural engines 314A, 314B, 314C. Neural engine 314C outputs corresponding data 520C based on, e.g., a flow control signal generated within neural engine 314C. Data 520D output from neural engine 314D may be generated by one of neural engines 314A through 314D in chain 502A. Neural engine 314D outputs corresponding data 520D onto channel 504A and to one of chain buffers 333 (e.g., chain buffer 333A) based on, e.g., a flow control signal generated within neural engine 314D, when control signal 516A indicates that one of chain buffers 333 (e.g., chain buffer 333A) is not full. Over multiple time periods, neural engine 314D outputs a set of data 520D onto channel 504A, and the set of data 520D includes data generated by each of neural engines 314A through 314D in chain 502A.

Similarly, for chain 502B, neural engines 314E through 314H propagate data 520E through 520G of the first size though chain 502B and output data 520H of the first size onto one of chain buffers 333 (e.g., chain buffer 333B) via channel 504B. Flow control circuit 332 generates a control signal 516B passed onto chain 502B and at least one of neural engines 314 in chain 502B (e.g., neural engine 314H) to stall output data 520H coming out from neural engine 520H and chain 502B when one of chain buffers 333 (e.g., chain buffer 333B) is full. Control signals 526E through 526G may be generated by a corresponding neural engine 314F through 314H in chain 502B, e.g., based on control signal 516B. Control signals 526E through 526G may control sending corresponding data 520E through 520G from each neural engine 314E through 314G into a corresponding next neural engine 314F through 314H in chain 502B. Control signal 526E may be configured to stall data 520E in neural engine 314E when a neural engine buffer in neural engine 314F is full and cannot store data 520E from neural engine 314E. Similarly, control signal 526F may be configured to stall data 520F in neural engine 314F when a neural engine buffer in neural engine 314G is full and cannot store data 520F from neural engine 314F. Similarly, control signal 526G may be configured to stall data 520G in neural engine 314G when a neural engine buffer in neural engine 314H is full and cannot store data 520G from neural engine 314G.

Data 520E may be generated by neural engine 314E and forwarded to neural engine 314F, e.g., based on control signal 526E. Data 520F output from neural engine 314F may be either generated by neural engine 314F or may represent data 520E generated by neural engine 314E. Neural engine 314F outputs corresponding data 520F based on e.g., a flow control signal generated within neural engine 314F. Data 520G forwarded into neural engine 314H (e.g., from neural engine 314G) may be generated by one of neural engines 314E, 314F, 314G. Neural engine 314G outputs corresponding data 520G based on a flow control signal generated within neural engine 314G. Data 520H output from neural engine 314H may be generated by one of neural engines 314E through 314H in chain 502B. Neural engine 314H outputs corresponding data 520H onto channel 504B and to one of chain buffers 333 (e.g., chain buffer 333B) based on e.g., a flow control signal generated within neural engine 314H, when control signal 516B indicates that one of chain buffers 333 (e.g., chain buffer 333B) is not full. Over multiple time periods, neural engine 314H outputs a set of data 520H onto channel 504B, and the set of data 520H includes data generated by each of neural engines 314E through 314H in chain 502B.

Similarly, for chain 502D, neural engines 314M through 314P propagate data 520M through 520O of the first size though chain 502D and output data 520P of the first size onto one of chain buffers 333 (e.g., chain buffer 333D) via channel 504D. Flow control circuit 332 generates a control signal 516D passed onto chain 502D and at least one of neural engines 314 in chain 502D (e.g., neural engine 314P) to stall output data 520P coming out from neural engine 520P and chain 502D when one of chain buffers 333 (e.g., chain buffer 333D) is full. Control signals 526M through 526O may be generated by a corresponding neural engine 314N through 314P in chain 502D, e.g., based on control signal 516D. Control signals 526M through 526O may control sending corresponding data 520M through 520O from each neural engine 314M through 314O into a corresponding next neural engine 314N through 314P in chain 502D. Control signal 526M may be configured to stall data 520M in neural engine 314M when a neural engine buffer in neural engine 314N is full and cannot store data 520M from neural engine 314M. Similarly, control signal 526N may be configured to stall data 520N in neural engine 314N when a neural engine buffer in neural engine 314O is full and cannot store data 520N from neural engine 314N. Similarly, control signal 526O may be configured to stall data 520O in neural engine 314O when a neural engine buffer in neural engine 314P is full and cannot store data 520O from neural engine 314O.

Data 520M may be generated by neural engine 314M and forwarded to neural engine 314N, e.g., based on control signal 526M. Data 520N output from neural engine 314N may be either generated by neural engine 314N or may represent data 520M generated by neural engine 314M. Neural engine 314N outputs corresponding data 520N based on, e.g., a flow control signal generated within neural engine 314N. Data 520O forwarded into neural engine 314P (e.g., from neural engine 314O) may be generated by one of neural engines 314M, 314N, 314O. Neural engine 314O outputs corresponding data 520O based on e.g., a flow control signal generated within neural engine 314O. Data 520P output from neural engine 314P may be generated by one of neural engines 314M through 314P in chain 502D. Neural engine 314P outputs corresponding data 520P onto channel 504D and to one of chain buffers 333 (e.g., chain buffer 333D) based on e.g., a flow control signal generated within neural engine 314P, when control signal 516D indicates that one of chain buffers 333 (e.g., chain buffer 333D) is not full. Over multiple time periods, neural engine 314P outputs a set of data 520P onto channel 504D, and the set of data 520P includes data generated by each of neural engines 314M through 314P in chain 502D.

The number of chain buffers 333 may be equal to the number of chains, e.g., each of four chain buffers 333A through 333D is coupled to a corresponding chain 502A through 502D. Chain buffers 333 store data 520D through 520P output from chains 502A through 502D. Furthermore, chain buffers 333 aggregate each of data 520D through 520P into aggregated data of the second size, e.g., into the set of data 520D through the set of data 520P. Internal channels 506 coupled to chain buffers 333 carry aggregated data from each of chains 502A through 502D in units of the second size onto selector circuit 508. Selector circuit 508 selects one of the aggregated data from one of chains 502A through 502D at a time based on control signal 510 generated by flow control circuit 332 for writing into buffer memory 334 via internal channel 512 in unit of the second size.

Figure 6:
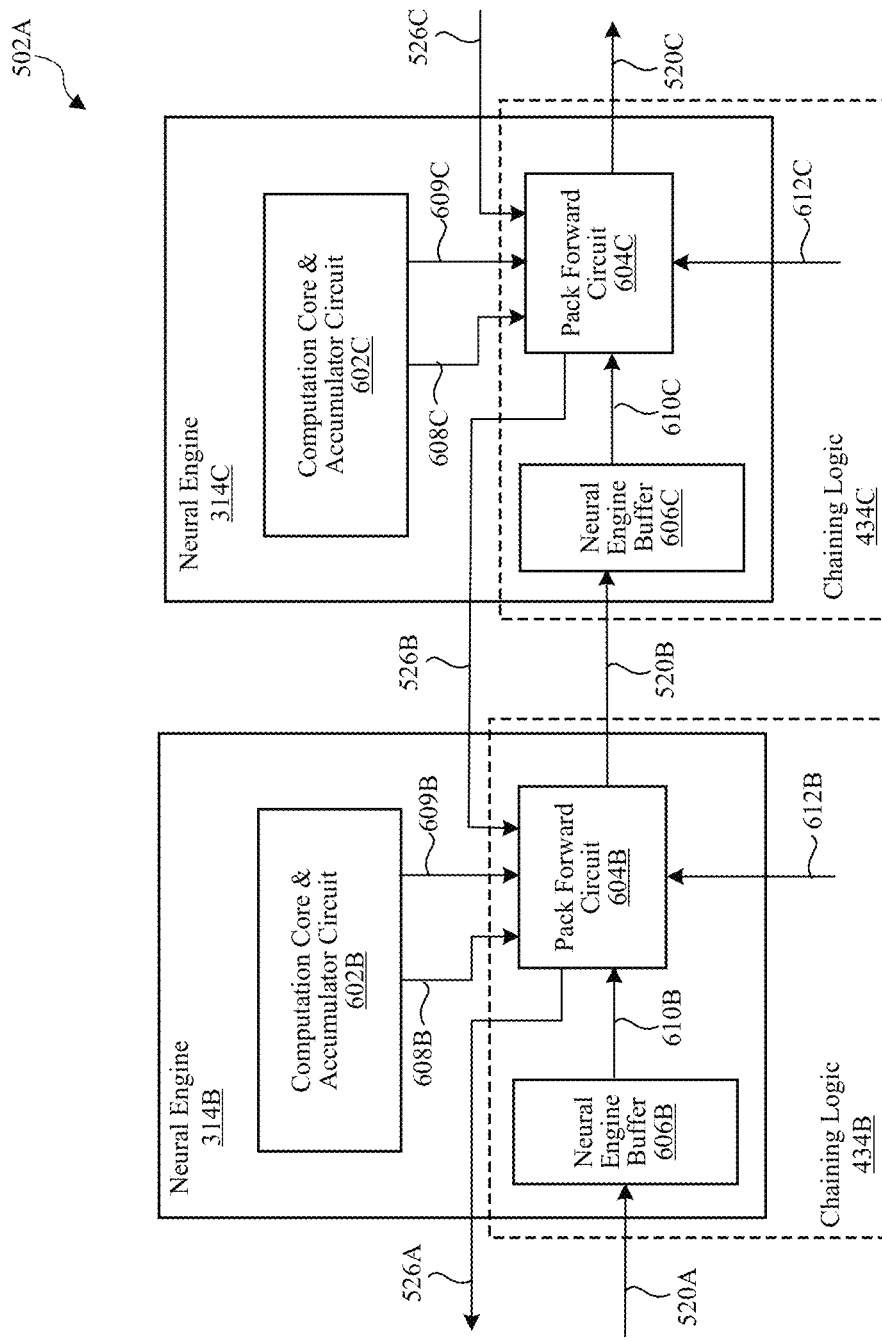
FIG. 6 is a block diagram of components of neural engines, according to one embodiment.

FIG. 6 is a block diagram of components of neural engines 314B and 314C, according to one embodiment. Neural engine 314B includes a computation core & accumulator circuit 602B and a chaining logic 434B having a pack forward circuit 604B and a neural engine buffer 606B. Chaining logic 434B is an embodiment of chaining logic 434 of FIG. 4 for neural engine 314B. Neural engine 314B may include some additional components not shown in FIG. 6. Similarly, neural engine 314C includes a computation core & accumulator circuit 602C and a chaining logic 434C having a pack forward circuit 604C and a neural engine buffer 606C. Chaining logic 434C is an embodiment of chaining logic 434 of FIG. 4 for neural engine 314C. Neural engine 314C may include some additional components not shown in FIG. 6.

Each of neural engine buffers 606B, 606C stores corresponding data 520A, 520B of the first size. Data 520A stored into neural engine buffer 606B may be generated by neural engine 314A. Data 520B stored into neural engine buffer 606C may be generated by neural engine 314A (e.g., may represent data 520A) or may be generated by neural engine 314B.

Each of computation core & accumulator circuits 602B, 602C includes computational core 416, accumulator circuit 414 and output circuit 424 described above in detail with reference to FIG. 4. Computation core & accumulator circuit 602B generates output data 608B passed onto pack forward circuit 604B. Computation core & accumulator circuit 602B (e.g., output circuit 424 within computation core & accumulator circuit 602B) also generates a flow control signal 609B passed onto pack forward circuit 604B. Furthermore, neural engine buffer 606B passes data 610B of the first size onto pack forward circuit 604B. Data 610B may correspond to data 520A stored into neural engine buffer 606B.

Pack forward circuit 604B is a circuit that packs multiple data (e.g., output data 608B and data 610B) and forwards one of the packed data (e.g., output data 608B or data 610B) to neural engine 314C. Based on flow control signal 609B, pack forward circuit 604B either forwards output data 608B as data 520B onto neural engine 314C or forwards data 610B (which may represent data 520A) onto neural engine 314C. Based on control signal 526B (e.g., provided via neural engine 314C), pack forward circuit 604B may stall data 520B when, e.g., neural engine buffer 606C is full. Furthermore, pack forward circuit 604B may generate control signal 526A for neural engine 314A. Additionally, pack forward circuit 604B may receive an end-of-chain signal 612B indicating whether neural engine 314B is configured as the last neural engine in chain 502A.

Similarly, computation core & accumulator circuit 602C generates output data 608C passed onto pack forward circuit 604C. Computation core & accumulator circuit 602C (e.g., output circuit 424 within computation core & accumulator circuit 602C) also generates a flow control signal 609C passed onto pack forward circuit 604C. Furthermore, neural engine buffer 606C passes data 610C of the first size onto pack forward circuit 604C. Data 610C may correspond to data 520B stored into neural buffer 606C. Pack forward circuit 604C is a circuit that packs multiple data (e.g., output data 608C and data 610C) and forwards one of the packed data (e.g., output data 608C or data 610C) to neural engine 314C. Based on flow control signal 609C, pack forward circuit 604C either forwards output data 608C as data 520C onto neural engine 314D or forwards data 610C (or data 520B which may correspond to either output data 608B or data 520A) onto neural engine 314D. Based on control signal 526C (e.g., provided via neural engine 314D), pack forward circuit 604C may stall data 520C when, e.g., the neural engine buffer in neural engine 314D (not shown in FIG. 6) is full. Furthermore, pack forward circuit 604C may generate control signal 526B for neural engine 314B. Additionally, pack forward circuit 604C may receive an end-of-chain signal 612C indicating whether neural engine 314C is configured as the last neural engine in chain 502A.

Figure 7A:
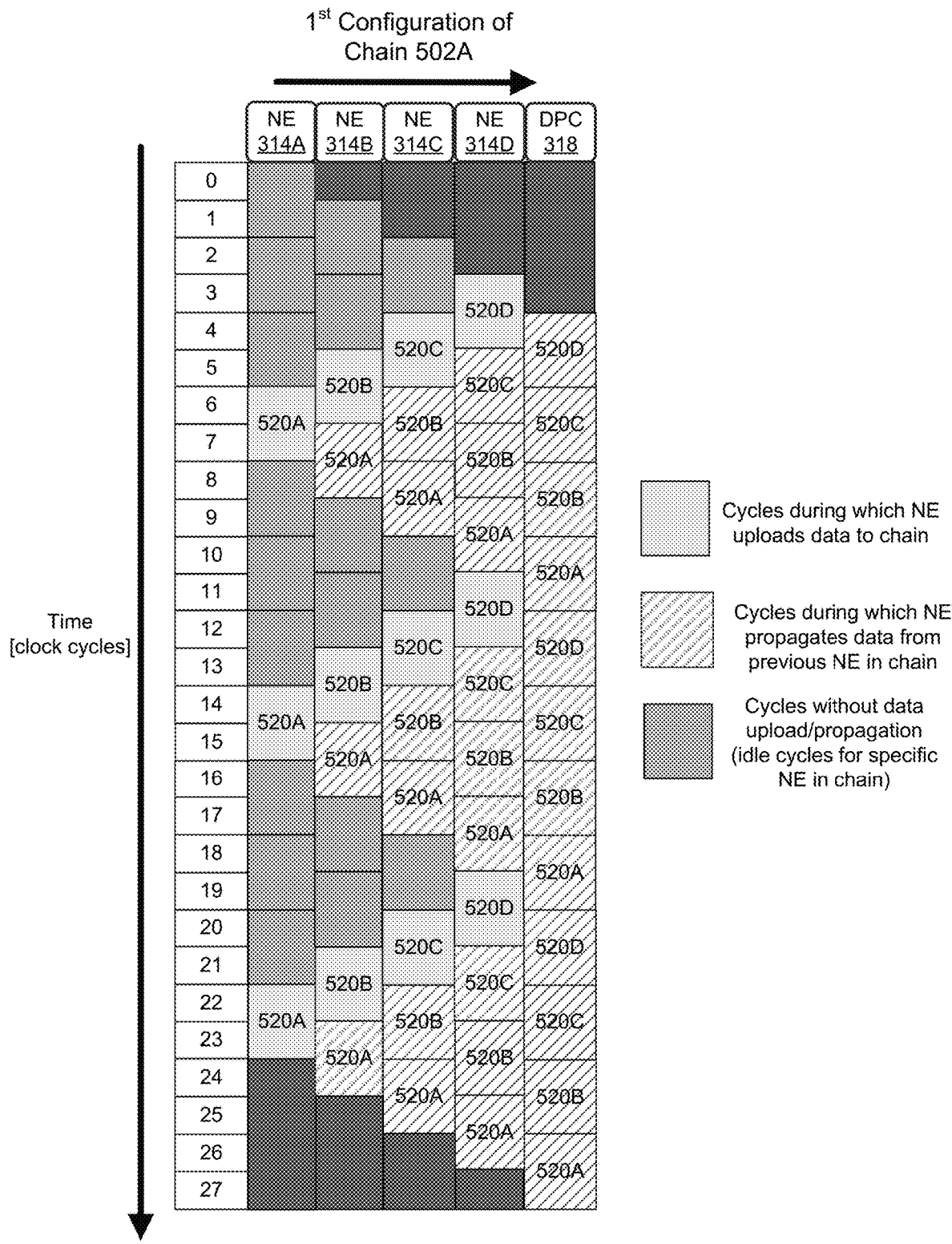
FIG. 7A illustrates an example data flow through a chain of neural engines pipelined into a configuration, according to one embodiment.

FIG. 7A illustrates an example data flow through chain 502A where neural engines 314A through 314D are pipelined in a first configuration, according to one embodiment. The first configuration may correspond to a configuration of chain 502A with four neural engines 314A through 314D, where neural engine 314A (NE 314A in FIG. 7A) forwards data of the first size to neural engine 314B (NE 314B in FIG. 7A), neural engine 314B forwards data of the first size to neural engine 314C (NE 314C in FIG. 7A), neural engine 314C forwards data of the first size to neural engine 314D (NE 314D in FIG. 7A), and neural engine 314D sends data of the first size out of chain 502A onto channel 504A and data processor circuit 318 (DPC 318 in FIG. 7A). The first configuration may be set by, e.g., configuration signal 505A generated by flow control circuit 332.

As shown in FIG. 7A, during clock cycles 3 and 4 (e.g., clock cycles of neural processor circuit 218), neural engine 314D generates data 520D of the first size and uploads data 520D to chain 502A. Data 520D is then output from chain 502A and written into data processor circuit 318 during clock cycles 4 and 5. During clock cycles 4 and 5, neural engine 314C generates data 520C of the first size and uploads data 520C to chain 502A. During clock cycles 5 and 6, neural engine 314D obtains data 520C from neural engine 314C. Data 520C is then output from chain 502A and written into data processor circuit 318 during clock cycles 6 and 7. During clock cycles 5 and 6, neural engine 314B generates data 520B of the first size and uploads data 520B to chain 502A. During clock cycles 6 and 7, neural engine 314C obtains data 520B from neural engine 314B. During clock cycles 7 and 8, neural engine 314D obtains data 520B from neural engine 314C. Data 520B is then output from chain 502A and written into data processor circuit 318 during clock cycles 8 and 9. During clock cycles 6 and 7, neural engine 314A generates data 520A of the first size and uploads data 520A to chain 502A. During clock cycles 7 and 8, neural engine 314B obtains data 520A from neural engine 314A. During clock cycles 8 and 9, neural engine 314C obtains data 520A from neural engine 314B. During clock cycles 9 and 10, neural engine 314D obtains data 520A from neural engine 314C. Data 520A is then output from chain 502A and written into data processor circuit 318 during clock cycles 10 and 11. The process described above of pipelining data of the first size through neural engines 314A through 314D in the first configuration of chain 502A and writing data 520D, 520C, 520B, and 520A into data processor circuit 318 can be repeated multiple times, e.g., for clock cycles 11 through 27, as illustrated in FIG. 7A.

Figure 7B:
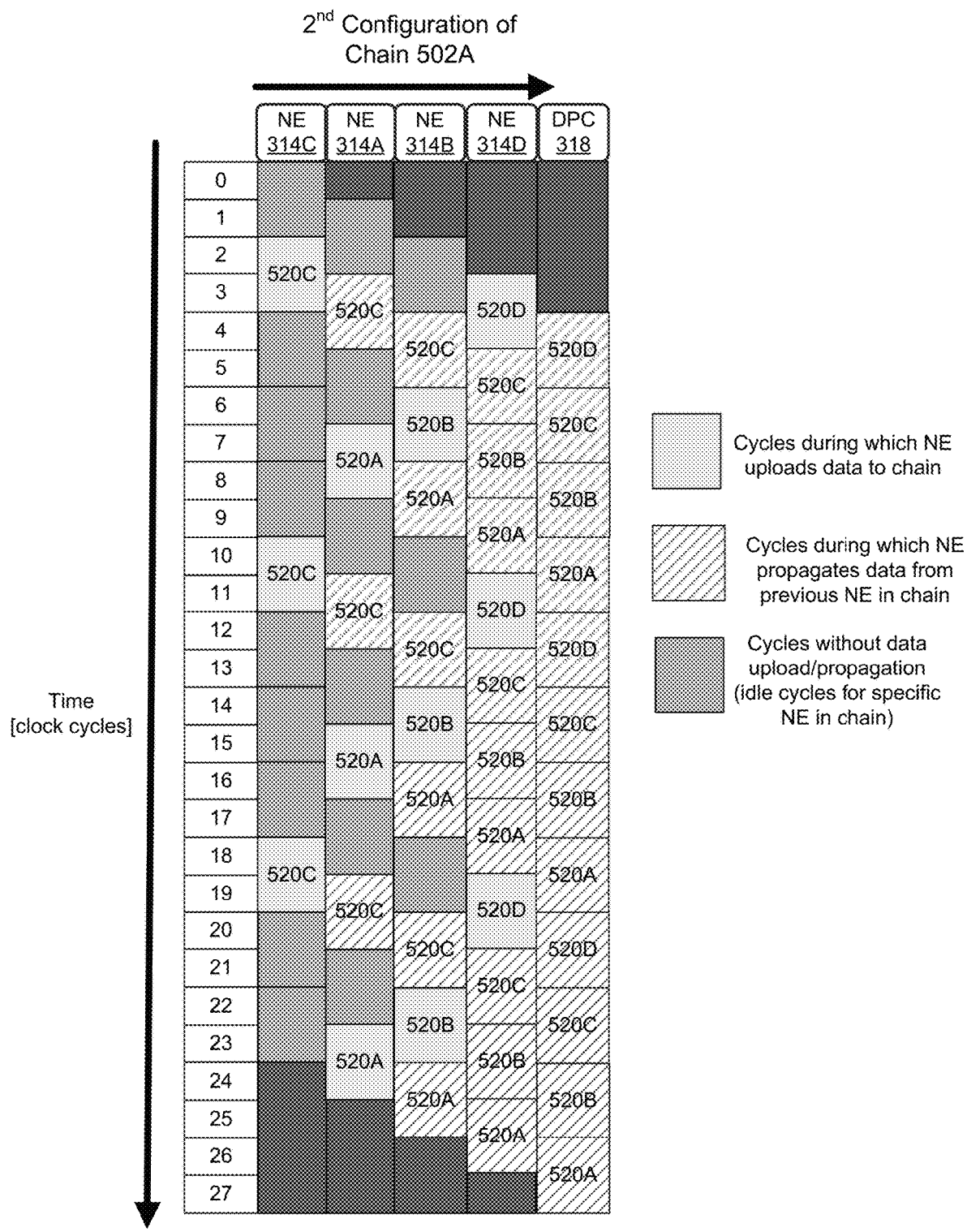
FIG. 7B illustrates another example data flow through the chain of neural engines pipelined into another configuration, according to one embodiment.

FIG. 7B illustrates an example data flow through chain 502A where neural engines 314A through 314D are pipelined in a second configuration different from the first configuration, according to one embodiment. The second configuration may correspond to a configuration of chain 502A with four neural engines 314A through 314D, where neural engine 314C (NE 314C in FIG. 7B) forwards data of the first size to neural engine 314A (NE 314A in FIG. 7B), neural engine 314A forwards data of the first size to neural engine 314B (NE 314B in FIG. 7B), neural engine 314B forwards data of the first size to neural engine 314D (NE 314D in FIG. 7B), and neural engine 314D sends data of the first size out of chain 502A onto channel 504A and data processor circuit 318 (DPC 318 in FIG. 7B). The second configuration may be set by, e.g., configuration signal 505A generated by flow control circuit 332. The second configuration may provide that power consumption is better distributed across neural engines 314A through 314D in comparison to the first configuration, e.g., power consumption can be evenly distributed across neural engines 314A through 314D in the second configuration of chain 502A.

During clock cycles 3 and 4 in FIG. 7B (e.g., clock cycles of neural processor circuit 218), neural engine 314D generates data 520D of the first size and uploads data 520D to chain 502A. Data 520D is then output from chain 502A and written into data processor circuit 318 during clock cycles 4 and 5. During clock cycles 2 and 3, neural engine 314C generates data 520C of the first size and uploads data 520C to chain 502A. During clock cycles 3 and 4, neural engine 314A obtains data 520C from neural engine 314C. During clock cycles 4 and 5, neural engine 314B obtains data 520C from neural engine 314C. During clock cycles 5 and 6, neural engine 314D obtains data 520C from neural engine 314B. Data 520C is then output from chain 502A and written into data processor circuit 318 during clock cycles 6 and 7. During clock cycles 6 and 7, neural engine 314B generates data 520B of the first size and uploads data 520B to chain 502A. During clock cycles 7 and 8, neural engine 314D obtains data 520B from neural engine 314B. Data 520B is then output from chain 502A and written into data processor circuit 318 during clock cycles 8 and 9. During clock cycles 7 and 8, neural engine 314A generates data 520A of the first size (and uploads data 520A to chain 502A. During clock cycles 8 and 9, neural engine 314B obtains data 520A from neural engine 314A. During clock cycles 9 and 10, neural engine 314D obtains data 520A from neural engine 314B. Data 520A is output from chain 502A and then written into data processor circuit 318 during clock cycles 10 and 11. The process described above of pipelining data of the first size through neural engines 314C, 314A, 314B, 314D in the second configuration of chain 502A and writing data 520D, 520C, 520B, 520A into data processor circuit 318 can be repeated multiple times, e.g., for clock cycles 10 through 27, as illustrated in FIG. 7B.

Example Operation of Writing Data Into Buffer Memory

Figure 8:
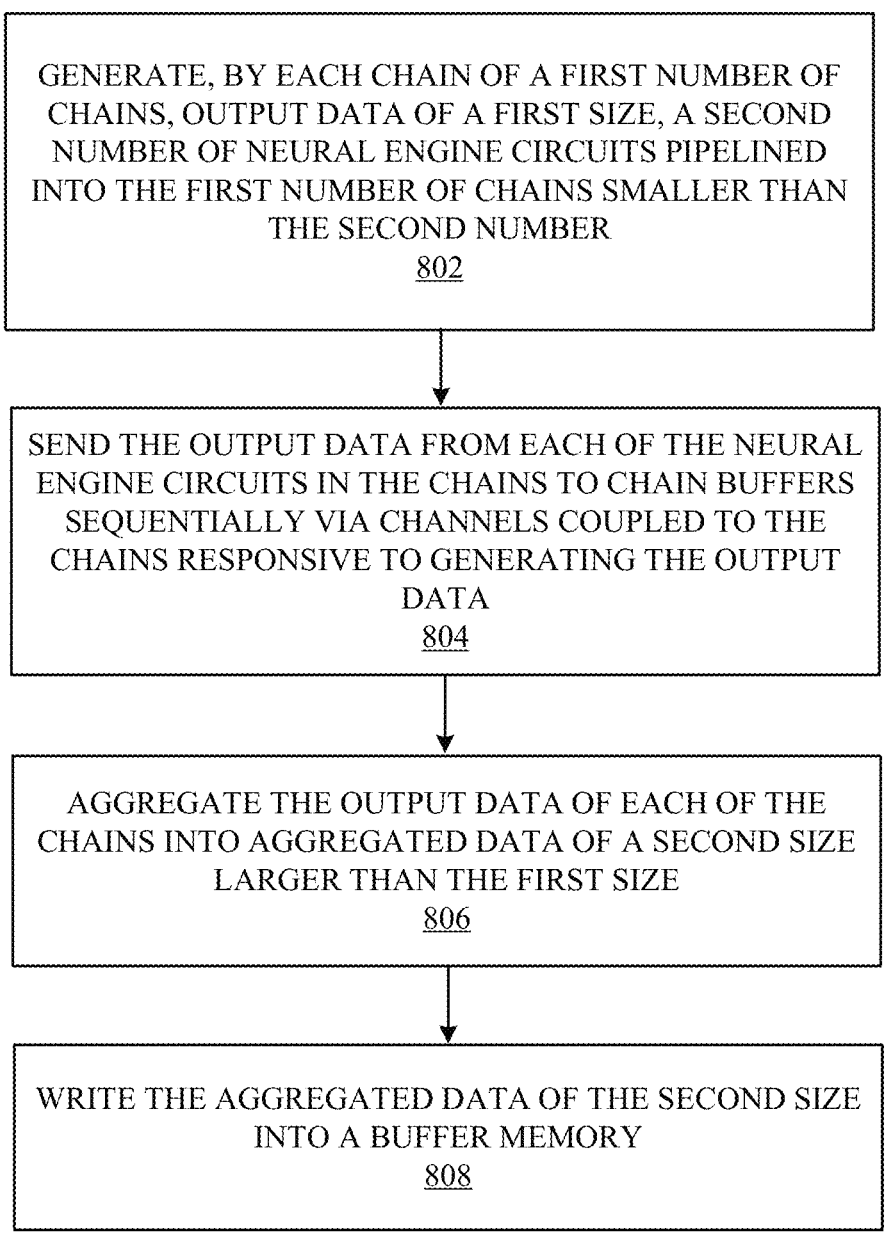
FIG. 8 is a flowchart illustrating a process of writing data from the chains of neural engines into a buffer memory of the data processor circuit, according to one embodiment.

FIG. 8 is a flowchart illustrating a process of writing aggregated data of the second size into a buffer memory of a data processor circuit, according to one embodiment. The process illustrated in FIG. 8 can be performed by components of neural processor circuit 218, e.g., by neural engines 314 pipelined into chains 502A through 502D, chaining logic 434, and components of data processor circuit 318 (e.g., flow control circuit 332, chain buffers 333 and buffer memory 334).

Neural processor circuit 218 generates 802, by each chain (e.g., chain 502A) of a first number of chains, output data of the first size, a second number of neural engine circuits pipelined into the first number of chains smaller than the second number. Neural processor circuit 218 sends 804 the output data from each of the neural engine circuits in the chains to chain buffers (e.g., chain buffers 333) sequentially via channels coupled to the chains responsive to generating the output data.

Neural processor circuit 218 aggregates 806 the output data of each of the chains into aggregated data of the second size. Neural processor circuit 218 writes 808 the aggregated data of the second size into a buffer memory (e.g., buffer memory 334) of data processor circuit 318.

The processes and their sequences illustrated in FIG. 8 are merely illustrative. Additional processes may be added and some processes in FIG. 8 may be omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising:
   a first number of neural engine circuits pipelined into a second number of chains;
   a third number of channels, a channel of the third number of channels coupled to a chain of the second number of chains and configured to transmit output data generated by the chain to a chain buffer; and
   a data processor circuit coupled to the channel to receive the output data, the data processor circuit configured to:
      receive, at a first time instance, a first data of a first size generated by a first neural engine circuit of the chain, wherein the chain has the first neural engine circuit interfaced with the data processor circuit;
      receive, at a second time instance different from the first time instance, a second data of the first size generated by a second neural engine circuit of the chain that is sequentially coupled to the first neural engine circuit, wherein the second data propagates within the chain from the second neural engine circuit through the first neural engine circuit in a first direction within the chain to reach the data processor circuit based on a control signal generated by the first neural engine circuit and sent to the second neural engine circuit in a second direction within the chain opposite to the first direction, wherein the control signal is configured to stall the second data from the second neural engine circuit in response to a neural engine buffer in the first neural engine circuit being full;
      store the first data in the chain buffer at the first time instance;
      store the second data in the chain buffer at the second time instance;
      aggregate data stored in the chain buffer into aggregated data of a second size, wherein the aggregated data comprises the first data and the second data, and wherein the second size is equal to or larger than twice the first size; and
      write the aggregated data of the second size into a buffer memory of the data processor circuit.

2. The neural processor circuit of claim 1, wherein the chain comprises the first neural engine circuit, the second neural engine circuit and a third neural engine circuit, the first neural engine circuit configured to:
   generate the first data of the first size, and
   send the first data to the third neural engine circuit or forward the second data of the first size generated by the second neural engine circuit to the third neural engine circuit, the aggregated data comprising the first data and the second data.

3. The neural processor circuit of claim 1, wherein the data processor circuit comprises:
   a plurality of chain buffers including the chain buffer configured to store the output data from the second number of chains including the chain, one chain buffer coupled to one chain of the second number of chains to generate the aggregated data of the second size for the one chain;
   an internal channel coupled to the one chain buffer to carry the aggregated data of the second size for the one chain, and
   a flow control circuit configured to select the aggregated data for the one chain for writing from the one chain buffer into the buffer memory.

4. The neural processor circuit of claim 3, wherein the flow control circuit is further configured to generate a control signal for the one chain to control propagating data through the one chain.

5. The neural processor circuit of claim 1, wherein the chain comprises the first neural engine circuit configured to:
   forward, based on a flow control signal, the first data of the first size generated by the first neural engine circuit in the chain to a third neural engine circuit in the chain, or
   forward, based on the control signal, the second data of the first size generated by the second neural engine circuit to the third neural engine circuit, the aggregated data comprising the first data and the second data.

6. The neural processor circuit of claim 1, further comprising a flow control circuit configured to generate a control signal for the chain to output the output data from the chain into the chain buffer.

7. The neural processor circuit of claim 1, wherein the first neural engine circuit in the chain includes the neural engine buffer configured to store the second data of the first size generated by the second neural engine circuit in the chain.

8. The neural processor circuit of claim 1, wherein the chain comprises the first neural engine circuit including a pack forward circuit configured to forward the first data of the first size into the neural engine buffer of a third neural engine circuit in the chain.

9. The neural processor circuit of claim 8, wherein the first data is generated by the first neural engine circuit or the first data is stored in the neural engine buffer of the first neural engine circuit.

10. A method comprising:
    generating, at a first time instance by a first neural engine circuit of a chain of a first number of chains, a first data of a first size, wherein the chain has the first neural engine circuit interfaced with a data processor circuit;
    generating, at a second time instance different from the first time instance and by a second neural engine circuit of the chain that is sequentially coupled to the first neural engine circuit, a second data of the first size, wherein the second data propagates within the chain from the second neural engine circuit through the first neural engine circuit in a first direction within the chain based on a control signal generated by the first neural engine circuit and sent to the second neural engine circuit in a second direction within the chain opposite to the first direction, wherein the control signal is configured to stall the second data from the second neural engine circuit in response to a neural engine buffer in the first neural engine circuit being full;

storing the first data in a chain buffer at a third time instance;

storing the second data in the chain buffer at a fourth time instance different from the third time instance;

aggregating data stored in the chain buffer into aggregated data of a second size, wherein the aggregated data comprises the first data and the second data, and wherein the second size is equal to or larger than twice the first size; and writing the aggregated data of the second size into a buffer memory of the data processor circuit.

11. The method of claim 10, further comprising:

sending, by the first neural engine circuit, the first data to a third neural engine circuit in the chain; or forwarding, by the first neural engine circuit, the second data of the first size generated by the second neural engine circuit in the chain to the third neural engine circuit, the aggregated data comprising the first data and the second data.

12. The method of claim 10, wherein the chain buffer is a first chain buffer, the chain is a first chain, and the aggregated data is a first aggregated data, and the method further comprising:

storing output data of the first size from a second chain into a second chain buffer;

aggregating the output data stored in the second chain buffer into a second aggregated data of the second size equal to or larger than twice the first size; and selecting the first aggregated data or the second aggregated data for writing from the chain buffer into the buffer memory.

13. The method of claim 10, further comprising generating a control signal for the chain to control propagating data through the chain.

14. The method of claim 10, further comprising:

forwarding, by the first neural engine circuit based on a flow control signal, the first data of the first size generated by the first neural engine circuit to a third neural engine circuit in the chain, or forwarding, based on the flow control signal, the second data of the first size generated by the second neural engine circuit to the third neural engine circuit, the aggregated data comprising the first data and the second data.

15. The method of claim 10, further comprising generating a control signal for the chain to generate the first data and store the first data into the chain buffer.

16. The method of claim 10, further comprising storing, in the neural engine buffer of the first neural engine circuit, the second data of the first size generated by the second neural engine circuit.

17. The method of claim 10, further comprising forwarding, from the first neural engine circuit, the first data of the first size into a neural engine buffer of a third neural engine circuit in the chain.

18. The method of claim 17, further comprising:

storing the first data in the neural engine buffer of the first neural engine circuit.

19. An electronic device, comprising:

a neural processor circuit including:
  a first number of neural engine circuits pipelined into a second number of chains;
  a third number of channels, a channel of the third number of channels coupled to a chain of the second number of chains and configured to transmit output data generated by the chain to a chain buffer;
  a data processor circuit coupled to the channel to receive the output data, the data processor circuit configured to:
    receive, at a first time instance, a first data of a first size generated by a first neural engine circuit of the chain, wherein the chain has the first neural engine circuit interfaced with the data processor circuit;
    receive, at a second time instance different from the first time instance, a second data of the first size generated by a second neural engine circuit of the chain that is sequentially coupled to the first neural engine circuit, wherein the second data propagates within the chain from the second neural engine circuit through the first neural engine circuit in a first direction within the chain to reach the data processor circuit based on a control signal generated by the first neural engine circuit and sent to the second neural engine circuit in a second direction within the chain opposite to the first direction, wherein the control signal is configured to stall the second data from the second neural engine circuit in response to a neural engine buffer in the first neural engine circuit being full;
    store the first data in the chain buffer at the first time instance;
    store the second data in the chain buffer at the second time instance;
    aggregate data stored in the chain buffer into aggregated data of a second size, wherein the aggregated data comprises the first data and the second data, and wherein the second size is equal to or larger than twice the first size; and
    write the aggregated data of the second size into a buffer memory of the data processor circuit; and
  a planar engine circuit coupled to the data processor circuit, the planar engine circuit configured to:
    receive data of the second size from the buffer memory, and
    perform at least one operation on the received data of the second size.

20. The electronic device of claim 19, wherein the second number of chains comprises the first neural engine circuit, the second neural engine circuit and a third neural engine circuit, the first neural engine circuit configured to:

generate the first data of the first size, and send the first data to the third neural engine circuit or forward the second data of the first size generated by the second neural engine circuit to the third neural engine circuit, the aggregated data comprising the first data and the second data.

* * * * *